United States Patent [19]

Shen

[11] Patent Number: 4,892,146

[45] Date of Patent: Jan. 9, 1990

[54] ALKALINE POLYMER HOT WATER OIL RECOVERY PROCESS

[75] Inventor: Chin W. Shen, Houston, Tex.

[73] Assignee: Texaco, Inc., White Plains, N.Y.

[21] Appl. No.: 286,092

[22] Filed: Dec. 19, 1988

[51] Int. Cl.[4] ............................................. E21B 43/24
[52] U.S. Cl. .................... 166/270; 166/272; 166/273; 166/274; 166/303
[58] Field of Search ................ 166/270–275, 166/303, 309.1; 252/8.554

[56] References Cited

U.S. PATENT DOCUMENTS

| | | | |
|---|---|---|---|
| 2,813,583 | 11/1957 | Marx et al. | 166/271 |
| 3,927,716 | 12/1975 | Burdyn et al. | 166/274 X |
| 3,977,470 | 8/1976 | Chang | 166/274 X |
| 4,291,765 | 9/1981 | Gilchrist et al. | 166/273 |
| 4,495,994 | 1/1985 | Brown et al. | 166/272 X |
| 4,597,443 | 7/1986 | Shu et al. | 166/272 |
| 4,646,833 | 3/1987 | De Ruiter | 166/272 |
| 4,660,641 | 4/1987 | Shen | 166/272 |

Primary Examiner—George A. Suchfield
Attorney, Agent, or Firm—Jack H. Park; Kenneth R. Priem

[57] ABSTRACT

The effectiveness of a water injection oil recovery process is increased by incorporating a viscosifying amount of a hydrophilic polymer in the injection fluid, together with from 0.005 to 2.0 percent by weight of an alkalinity agent, preferably sodium hydroxide, and from 0.01 to 5.0 percent by weight of an alkalinity stabilizing agent, preferably sodium carbonate. The hot alkaline polymer water flood is especially effective when applied after a steam flood to recover oil bypassed by the steam.

17 Claims, 2 Drawing Sheets

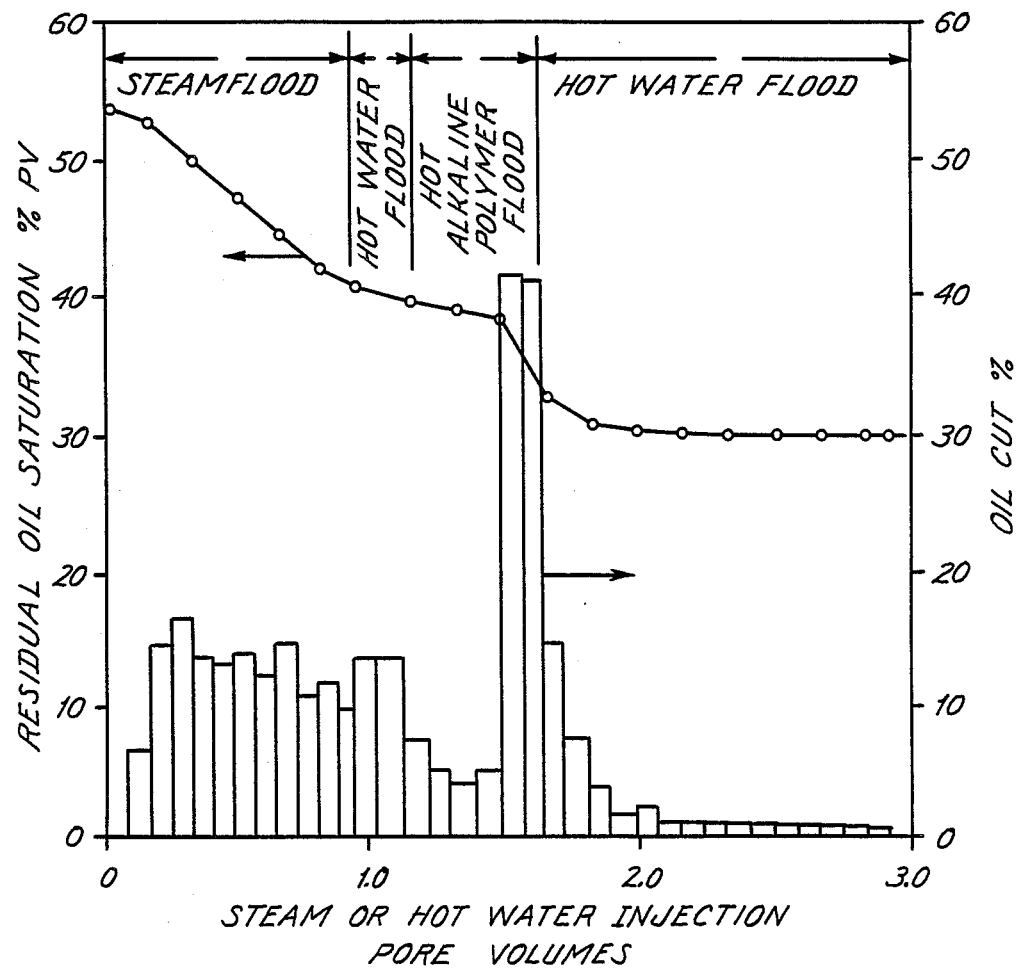

ALKALINE POLYMER HOT WATER OIL RECOVERY PROCESS

FIELD OF THE INVENTION

This invention relates to a method for recovering petroleum from subterranean deposits thereof. More specifically, this method involves a method for recovering petroleum including relatively viscous petroleum from subterranean deposits by application of an alkaline polymer hot water flooding process. Still more specifically, this invention involves introducing an aqueous drive fluid, containing a hydrophilic polymer and an alkalinity agent and preferably also including an alkalinity stabilizing agent or chemical co-reactant to increase the oil recovery effectiveness of the hot water flood. In one embodiment, this invention pertains to an alkaline, polymer-containing hot water flood applied after a conventional steam flood.

BACKGROUND OF THE INVENTION

There are many subterranean reservoirs which contain petroleum the viscosity of which is so great that relatively minor amounts thereof can be recovered from a formation by so called primary recovery. Many processes have been described in the prior art for increasing the recovery of viscous petroleum from these formations, and a few have been successfully applied on a commercial basis. Steam flooding is the most successful method utilized commercially for this purpose, and there are numerous commercial steam flood operations on-going at the present time. While steam flooding has been effective for recovering a significant amount of otherwise unrecoverable viscous petroleum from subterranean formations, it is not entirely satisfactory, especially in certain situations. In a conventional steam drive process, a number of injection wells and a number of spaced apart production wells are drilled into the formation, and steam is injected into the injection wells to displace petroleum essentially laterally through the formation toward the production wells. The steam that is injected into the formation is usually a two phase mixture, comprising a vapor phase and a liquid phase. Because of the significant difference in the specific gravity or density of these two phases, the vapor phase portion of the steam migrates fairly quickly to the upper portion of the subterranean petroleum containing formation, and essentially all of the hot liquid phase portion of the steam migrates into the bottom portion of the formation. Vapor phase steam is more effective than hot water at displacing viscous petroleum, and so the portion of the formation swept by the steam vapor is desaturated to a greater extent than the portion of the formation swept by the liquid phase steam condensate.

The addition of chemicals to the steam for the purpose of increasing the oil recovery effectiveness of the liquid phase condensate portion of the steam oil recovery fluid has been recognized, and numerous prior art references to be discussed below have disclosed various additives for this purpose. None have proven to be entirely satisfactory, however, and one common problem which reduces the effectiveness of many of the additives which are coinjected with the steam or other oil displacement fluid is the tendency for the formation mineral matrix to absorb the added chemicals, thereafter rendering them ineffective for the purpose of increasing the oil displacement efficiency of the liquid phase portion of the steam. Because of the relatively large amount of petroleum remaining in the formation after termination of a steam drive oil recovery process, there is a significant unfulfilled need for a process to be applied to a formation after conclusion of a steam drive oil recovery process to recover an additional increment of oil remaining after conclusion of the steam flood.

DESCRIPTION OF PRIOR ART

The following references show the state of the art utilizing additives for water or steam which are related to the present process.

U.S. Pat. No. 1,651,311, Howard Atkinson, Nov. 29, 1927 describes a method for recovering petroleum comprising injecting water having dissolved therein a strong alkali.

U.S. Pat. No. 3,191,676, H. Robert Froning, June 29, 1965, describes an oil recovery process using ambient temperature water containing a mixture of water-soluble carbonates and water-soluble phosphate salts.

U.S. Pat. No. 3,279,538, T. M. Doscher, Oct. 18, 1966, describes an oil recovery method involving injection of a very dilute aqueous alkaline solution and steam in combination.

U.S. Pat. No. 3,490,532, Joseph T. Carlin, Jan. 20, 1970, describes a method for recovering viscous petroleum by injecting an ambient temperature aqueous fluid containing an alkalinity agent such as an alkali metal hydroxide and a solubilizing agent such as quinoline to emulsify the viscous petroleum.

U.S. Pat. No. 3,527,303 R. W. Zwicky, Sept. 8, 1970, describes a steam soak process using caustic or detergent in the steam.

U.S. Pat. No. 3,687,197, David A. Redford, Aug. 29, 1972, describes a method for recovering viscous petroleum including bitumen from tar sand deposits by injecting a hot aqueous solution containing a caustic material dissolved therein.

U.S. Pat. No. 3,690,376, R. W. Zwicky and Robert M. Gies, Sept. 12, 1972, describes an oil recovery process involving injection of steam containing an alkali metal carbonate and a sequestering agent such as alkali metal sulfates, sulfites, polyphosphates, polyamine polyacetyate and the like.

U.S. Pat. No. 3,731,741 Palmer et al, May 8, 1973, describes an oil recovery process using an aqueous alkaline flooding medium containing a solubilizing agent.

U.S. Pat. No. 3,853,178, C. W. Shen, Dec. 10, 1974, describes a steam displacement oil recovery method employing steam containing a very small amount of caustic material such as sodium hydroxide.

U.S. Pat. No. 3,880,237, Snavely, Jr. et al, Apr. 29, 1975, describes an oil recovery process in which injection water is first treated with sulfur dioxide to reduce the bicarbonate ion concentration after which an alkalinity agent is added to the water.

U.S. Pat. No. 3,913,671, Redford et al, Oct. 21, 1975, describes a single well process for recovering bitumen from a tar sand deposit by circulating hot, alkaline water through a portion of the formation.

U.S. Pat. No. 3,924,683, George et al, Dec. 9, 1975, describes a "huff and puff" steam stimulation process using steam and caustic.

U.S. Pat. No. 3,977,470, H. L. Chang, Aug. 32, 1976, describes a chemical oil recovery method employing inorganic polyphosphates, and an alkaline agent and an inorganic carbonate.

U.S. Pat. No. 4,223,730, Walther Schulz and Wilhelm Gebetsberger, Sept. 23, 1980, describes a method for recovering petroleum by flooding with hot water containing an alkali such as sodium hydroxide.

U.S. Pat. No. 4,441,555, W. R. Shu, Apr. 10, 1984, describes an oil recovery method using hot water saturated With carbon dioxide and containing a $CO_2$ solubility promoter such as sodium hydroxide or sodium carbonate.

U.S. Pat. No. 4,487,262, Venkatesan et al, Dec. 11, 1984, describes a heavy oil recovery method using a hot alkaline solution of sodium hydroxide and sodium bicarbonate.

U.S. Pat. No. 4,523,645, V. N. Vekatesan, June 18, 1985, describes an oil recovery method employing a solution containing sodium bicarbonate and citric acid in combination with steam and carbon dioxide.

U.S. Pat. No. 2,813,583, J. W. Marx and H. W. Parker, Nov. 19, 1957, describes a method for recovering petroleum by injecting hot water or steam containing sufficient alkalinity agent to raise the pH of the treating fluid to a value greater than 7.5, the alkalinity agent being preferably ammonia or alkali metal compound such as hydroxide or carbonates.

U.S. Pat. No. 4,660,641, C. W. Shen, Apr. 28, 1987, describes an oil recovery process employing steam, an alkalinity agent such as sodium hydroxide and a buffering or co-reactant salt such as sodium carbonate.

SUMMARY OF THE INVENTION

My invention concerns an improvement in hot water flooding, in which hot water containing a viscosifying amount of hydrophilic polymer such as polyacrylamide or polysaccharide and an alkaline metal hydroxide, preferably sodium hydroxide or other alkaline materials such as sodium silicate or sodium orthosilicate, alone or preferably in combination with sodium carbonate or sodium bicarbonate is injected into the formation to displace oil to a production well. The ratio and concentration of the alkaline metal hydroxide and sodium carbonate or sodium bicarbonate chemicals is critical and when used in the proper ratio result in a solution, in which the pH changes only slowly as the alkaline earth hydroxide is absorbed from the aqueous solution by the formation matrix. The sodium hydroxide or other alkalinity agent and sodium carbonate may be injected in the desired ratio and concentration on a continuous basis as hot water is injected into the formation, or separate aqueous slugs of these materials may be injected in a sequential manner during the course of hot water injection, in order to accomplish mixing of the alkaline agent and carbonate in the desired ratio. Sodium hydroxide reduces the interfacial tension between oil and water and reverses the formation wettability from oil wet to water wet. The presence of sodium carbonate in the critical ratio greatly reduces the rate of absorption of sodium hydroxide from the liquid phase, so the interfacial tension reduction effect persists for longer periods of time as the hot water condensate displacement progresses through the formation. The hydrophilic polymer improves the mobility ratio of the displacing and displaced fluids, thereby increasing the displacement efficiency of the process. This process may be applied as the principal oil recovery process or it may be applied at the conclusion of a steam drive oil recovery process to recover oil remaining in unswept portions of the formation.

BRIEF DESCRIPTION OF THE DRAWINGS

FIG. 2 illustrates a preferred embodiment of the process of my invention in which a formation is first subjected to steam flooding followed by a hot water flood using a fluid containing a hydrophilic polymer and both sodium carbonate and sodium hydroxide.

DESCRIPTION OF PREFERRED EMBODIMENTS

Figure 1:
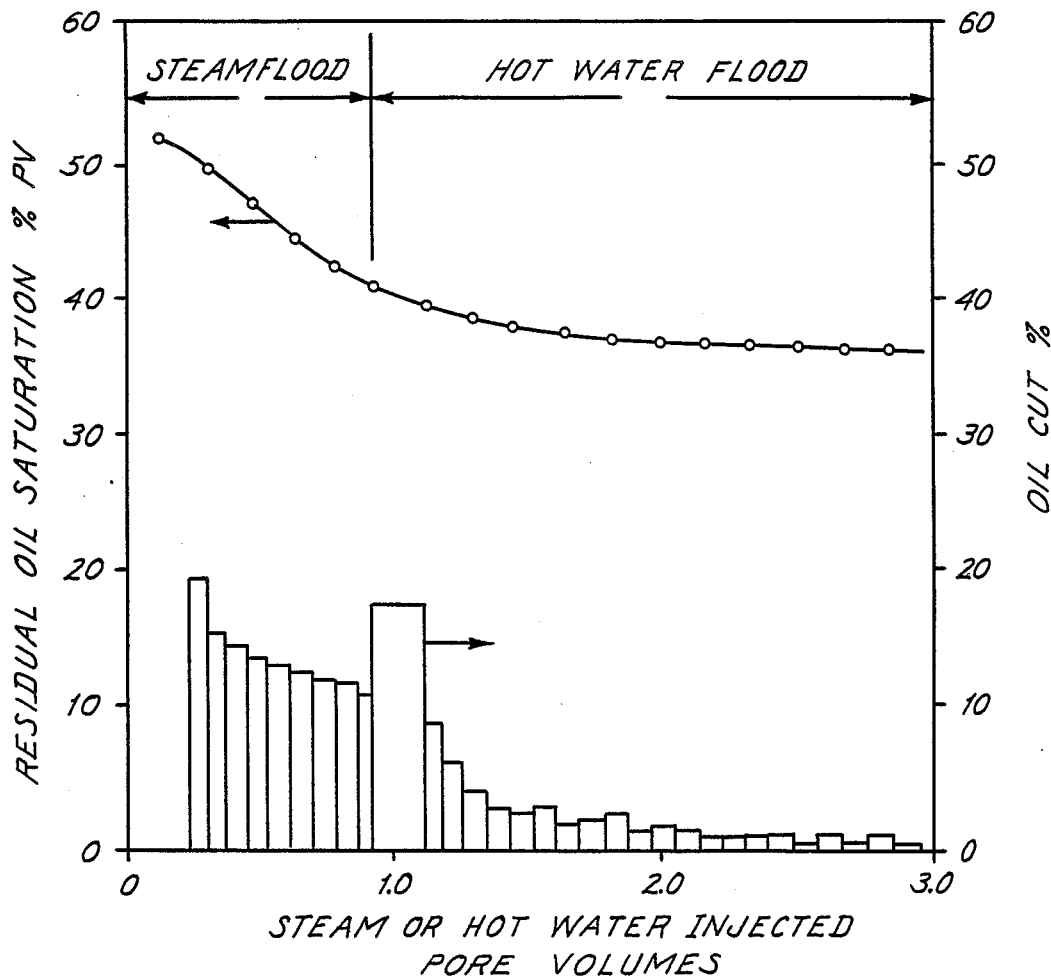
FIG. 1 illustrates graphically the percent oil recovery accomplished by the use of conventional steam drive oil recovery process followed by a hot water flood.

My invention is concerned with an improvement in hot water flooding oil recovery processes. It may be applied advantageously to formations which have been previously subjected to steam flooding. Because of the differences in specific gravity, when steam is injected in conventional flooding methods, steam vapor migrates to the upper portion of the formation and the liquid phase is confined in the lower portion of the formation. The vapor phase of steam is more effective for displacing petroleum, and the liquid phase which passes through the bottom of the formation does not displace petroleum as well as would be desired. This phenomenon is especially detrimental to the oil recovery effectiveness when the flooding technique is a steam drive in which two-phase steam is injected into a formation by an injection well, with the steam displacing petroleum through the formation for a substantial distance in an essentially horizontal direction, which gives the injected steam sufficient time to separate completely into a liquid phase and a vapor phase. This produces the effect referred to as steam override, in which significant portions of the formation are contacted by two distinctly different phases. The upper portion of the formation is swept almost entirely by vapor phase steam, and the bottom portion of the formation is swept almost entirely by liquid phase hot water. As steam vapor migrates more rapidly through the formation than liquid, and as the stripping of petroleum progresses through the upper portion of the formation, desaturation of the formation results in a dramatic increase in the permeability of the portion of the formation which has been swept by the steam vapor. Once steam vapor break-through occurs at the production well, subsequently injected steam moves rapidly through the upper portion of the formation which has already been swept and desaturated of petroleum by the steam vapor, with very little additional displacement occurring in the bottom portion of the formation. The result is that a significant amount of petroleum is not recovered from the recovery zone of the formation. Once this condition has progressed to the above-described level, there is no treatment disclosed in the prior art which effectively permits sweeping the bottom portion of the formation in order to recover the unrecovered petroleum. Accordingly, it is an objective of one embodiment of my invention to recover additional oil remaining in the portion of the formation swept by steam condensate, i.e. the lower portion of the formation which is normally only contacted by steam condensate or hot liquid phase water. This is accomplished by injecting hot viscous alkaline water into the formation after completion of the steam drive process. The persistent alkalinity of the hot liquid displacement fluid reduces the interfacial tension between oil and water and reverses the formation wettability from oil wet to water wet. The increased viscosity resulting from use of the hydrophilic polymer produces good volumetric displacement efficiency. Without the viscosity increasing effect of the polymer, the mobility ratio of the injected hot water is so poor that very little displacement occurs in the lower portion of the formulation, because of the severe difference in permeabilities of the upper zone which has been swept with steam vapor causing removal of the petroleum therefrom, and the lower portion of the formation where liquid phase steam condensate was present during the steam flood. Thus a hot water flood without polymer would recover little or no additional oil in this situation.

Although the addition of alkaline materials to water injected into formations according to prior art references has been shown to increase the displacement efficiency in laboratory scale tests, the use of sodium hydroxide, for example, as an additive for water in commercial use has not been entirely effective because the excessive absorption of sodium hydroxide from the liquid phase solution by formation surfaces, e.g. rock formation surfaces, removes the interfacial tension reducing additive from the flood long before it has progressed a significant distance away from the injection well into the formation. This adverse affect of absorption of sodium hydroxide cannot effectively be offset by increasing the concentration of sodium hydroxide, since very high concentrations of sodium hydroxide promote rapid formation of an emulsion which adversely affects the permeability of the formation to the flow of fluids therethrough.

I have discovered that the effectiveness of an alkalinity agent such as an alkali metal hydroxide, specifically and preferably sodium hydroxide, can be greatly enhanced if an alkalinity stabilizing agent is included in the injected oil displacing fluid. I have found that sodium carbonate or sodium bicarbonate, if mixed with sodium hydroxide in a critical ratio, produces a solution in which the effectiveness of sodium hydroxide component of the displacing fluid persists for a much longer time as the fluid passes through the formation. The effectiveness of this synergistic reaction is shown in my U.S. Pat. No. 4,660,641 which is incorporated herein by reference.

In its broadest aspect, the present invention contemplates that the portion of the formation previously contacted by the liquid phase component of steam during a previous steam flood, will be contacted by a mixture of sodium carbonate ($Na_2CO_3$) and sodium hydroxide (NaOH) in a preferred embodiment of the hot, viscous alkaline flood of my invention. The main purpose of the alkalinity agent, e.g. the sodium hydroxide, is to control the pH and function as an interfacial tension reducer so the displacement of oil by water is more effective, e.g. is a low surface tension displacement process. The main function served by the sodium carbonate or sodium bicarbonate, is to ensure that the pH changes very slowly as the alkalinity agent reacts as intended, or as it is absorbed from solution by the formation mineral matrix. Sodium carbonate also provides a source of sodium ions to exchange with hydrogen ions on the clay surfaces (instead of hydroxide ions) and also serves to remove calcium ions from the clay surface. The presence of sodium carbonate will hold down the reactivity of the alkalinity agent, the sodium hydroxide in the preferred embodiment, so less sodium hydroxide is consumed by unproductive reactions, making more sodium hydroxide available for reaction with the crude oil in its beneficial effect, that of reducing interfacial tension between the aqueous displacing phase and the formation petroleum. I have found that losses of sodium carbonate by absorption are essentially negligible in oil saturated sands and similar formation matrices, whereas the loss of sodium hydroxide when used alone is significant and fairly rapid. When the two are used together in a critical ratio as disclosed herein, I have discovered that the loss of sodium hydroxide from the hot alkaline flood is reduced significantly as a consequence of the presence of sodium carbonate.

In the practice of my invention, it is contemplated that at least one component from each of two groups described below will be present in an aqueous solution form, either by incorporating them directly in the aqueous liquid phase of the displacing fluid injected into the formation, or in one or more separate aqueous slugs to be injected sequentially with the injection of hot water.

The first component required is an alkalinity agent, and the preferred alkalinity agents are the alkali earth metal hydroxide such as sodium hydroxide, potassium hydroxide or lithium hydroxide. Other alkalinity agents such as sodium silicate, sodium orthosilicate or mixtures of these can also be used. Clearly the especially preferred alkalinity agent is sodium hydroxide, primarily because of its effectiveness, availability and low cost.

The alkalinity stabilizing agent should be an alkali earth carbonate such as sodium carbonate, although sodium bicarbonate may also be used. Sodium carbonate is believed to be more effective than sodium bicarbonate for this purpose, and in view of its effectiveness and low cost, it is clearly the preferred agent for the process of my invention.

The volume of hot aqueous fluid containing the alkalinity agent, alkalinity stabilizing agent and viscosity increasing polymer used in my oil recovery process is from 0.005 to 1.0 and preferably from 0.3 to 0.8 pore volume based on the volume of formation being stimulated.

The concentration of the alkalinity stabilizing agent, preferably sodium carbonate, as used in the process of my invention is from 0.01 percent to 5.0 percent by weight, and preferably is in the range from 0.05 to 3.0 percent by weight. The concentration of sodium hydroxide or other alkalinity agent should be in the range from about 0.005 percent by weight to about 2.0 percent by weight, and preferably in the range of from 0.01 to 1.0 percent by weight. The ratio of the agent concentration to the alkalinity agent concentration should be in the range of from about .01 to about 400 and preferably in the range of from 0.02 to 200. The especially preferred ratio is from 0.5 to 20.

In another embodiment, the steam injected into the formation also contains an alkalinity agent such as sodium hydroxide and sodium carbonate or other alkalinity-stabilizing agent in about the same concentration range as is described above.

The viscosity-increasing hydrophilic polymer may be any hydrophilic polymer normally used in enhanced oil recovery processes, so long as it is stable at the temperature of the injected fluid or of the formation, whichever is higher. It is usually satisfactory if the polymer is stable up to about 250° F. Polysaccharides are suitable for this purpose. Partially hydrolyzed polyacrylamides are also suitable. The concentration of polymer is from 0.01 to 2.0 percent and preferably from 0.02 to 1.0 percent by weight.

The alkalinity solution including sodium hydroxide and sodium carbonate may be co-mixed with polymer in the fluid introduced into the formation, or separate slugs of the alkalinity solution and polymer solution may be alternately injected into the formation.

The concentrations of alkalinity agent and/or the polymer agent may be maintained at the same level throughout the injection, or may be tapered downward toward the end of the injection.

The process can also be applied to light oil reservoir as an enhanced water flood process. The reservoir and the injected fluid do not need to be heated in this embodiment.

The benefit of the process of my invention is achieved if the solution of polymer, of sodium carbonate and sodium hydroxide contacts at least a substantial portion of the formation which was contacted by the liquid phase or condensate portion of the previously injected steam.

Although most of the disclosure of the means of applying specific embodiments of the process of my invention involve steam drive or through-put processes in which steam is injected into the formation via at least one injection well on a more or less continuous basis to displace petroleum through the formation to at least one spaced-apart production well, clearly the benefits of the process of my invention may also be realized in a push-pull or single well steam stimulation technique, in which multiple cycles of steam rejection followed by oil production are applied by a single well, after which an aqueous fluid containing polymer, sodium hydroxide and sodium carbonate are injected into a formation, followed by a soak, if desired, followed by recovery of the injected fluids together with oil mobilized by the injected fluid is accomplished from the same well as was used for injection of the various fluids.

For the purpose of illustrating the benefits that can be realized by application of various embodiments of the process of my invention, the following experiments were performed as will be described in detail below.

EXPERIMENTAL SECTION

A series of experiments were performed to verify that absorption of sodium hydroxide by a typical oil-containing formation specimen is high for sodium hydroxide, much less for sodium carbonate, and that the presence of sodium carbonate will reduce the amount of sodium hydroxide absorbed from an aqueous solution on contact with earth formation. Aqueous solutions of sodium hydroxide and sodium carbonate, alone and in combination, were flowed through a formation core sample obtained from the Kern River field located in California. The concentration of sodium hydroxide and sodium carbonate in the effluent exiting from the cell was determined after passage of up to seven pore volumes of fluid through the pore sample. The data contained in Table I below illustrate the observed concentrations. It should be understood that a low concentration in the effluent indicates a high absorption of either sodium carbonate or sodium hydroxide. In this table, Fluid 1 is water containing 0.24 percent sodium carbonate with no sodium hydroxide. Fluid 2 is water containing 0.08 percent sodium hydroxide plus 0.24 percent sodium carbonate. Fluid 3 is water containing 0.8 sodium hydroxide plus 0.24 percent sodium carbonate and Fluid 4 is water containing 0.08 percent sodium hydroxide with no sodium carbonate.

TABLE I

| Pore Volumes of Injected Fluid | Chemical Concentration in Effluent (% of Injected Concentration Fluid) | | | |
|---|---|---|---|---|
| | 1 | 2 | 3 | 4 |
| 1 | 90 | 90 | 0 | 0 |
| 3 | 100 | 95 | 30 | 0 |
| 5 | 100 | 95 | 50 | 25 |
| 7 | 100 | 100 | 75 | 38 |

It can be seen from the above that sodium hydroxide was absorbed to a very great degree by this formation rock sample, whereas sodium carbonate was not. The fluids containing a mixture of sodium carbonate with sodium hydroxide resulted in a very low absorption rate of both chemicals, indicating that the presence of sodium carbonate greatly reduced the rate of absorption of sodium hydroxide.

In another experiment, a laboratory model was constructed to represent an aerial physical model scaled to simulate a quarter of a two-and one-half acre, 88 foot thick confined five spot pattern, utilizing Ottwa sand as the formation mineral matrix. The model was saturated with Kern River Field (Calif.) water and crude oil to an initial oil saturation of 63.6 percent. Steam was injected at about 431 B/D at 60% quality and the hot water injection rate was about 460 B/D. The steam and hot water flood temperatures at the model entrance were 330° F. and 200° F., respectively. As can be seen in the hot water flood experiment (FIG. 2), a hot water flood was followed by the steam flood to fill up the void space caused by the steam injection. The alkaline polymer hot water flood containing a mixture of sodium hydroxide 0.1% by weight, sodium carbonate 0.3% by weight and polymer 0.25% by weight followed. Oil cut jumped up from less than 5% to 41% during the hot water flood. The increase of oil cut was tremendous as compared to the regular hot water flood following the steam flood (see FIG. 1). These data clearly indicate that the process of my invention produces a result which was significantly better than that of a regular hot water flood after a steam flood.

A series of experiments was performed to determine the effect of varying the concentration of both sodium carbonate and sodium hydroxide in floods employing hot aqueous solutions containing both sodium carbonate and sodium hydroxide. For each concentration, there was a critical ratio of sodium carbonate and sodium hydroxide, as is evidenced by the minimum value of remaining oil saturation after 10 pore volumes of chemical injection. The best results are obtained utilizing 0.24 percent sodium carbonate and 0.12 percent sodium hydroxide. These results clearly indicate that there is a synergistic reaction between sodium carbonate and sodium hydroxide when employed in the process of my invention. There is a minimum oil saturation, and hence an optimum result, for each concentration of sodium carbonate. The optimum sodium hydroxide concentration became smaller as the amount of sodium carbonate employed was increased. A fairly wide range of combinations of sodium carbonate and sodium hydroxide exists which provides effective oil mobilization and subsequent recovery.

Opitmum results were obtained using the following concentrations:

TABLE II

| Na₂CO₃(%) | NaOH Conc. (%) | % NA₂CO₃ Ratio % NaOH |
|---|---|---|
| 0.16 | 0.09–0.15 | 1.77–1.06 |
| 0.24 | 0.06–0.15 | 4.0–1.60 |
| 0.32 | 0.04–0.14 | 8.0–2.29 |
| 0.40 | 0.01–.06 | 40.0–6.66 |
| 0.48 | N/A | N/A |

Based on the above data, it can be seen that the Na₂CO₃/NaOH ratio should be between 1 and 8 and preferably between 1 and 2 when the Na₂CO₃ concentration is from about 0 12 to about 0.2%; from 1.6 to 4 when the Na₂CO₃ concentration is from 0.20 to 0.28; and from 2 to 8 when the Na₂CO₃ concentration is from 0.18 to 0.36.

Another series of experiments was performed to investigate the effectiveness of using alternating slugs of sodium carbonate and sodium hydroxide solutions. Sodium carbonate was injected into the initial slug in each case. The results are shown in Table III immediately hereinafter below.

TABLE III

| Na₂CO₃ Conc. | NaOH Conc | Continuous Mixture Injection (Na₂CO₃/NaOH) | Residual Oil Saturation Alternation Slugs |
|---|---|---|---|
| 0.08% | 0.08% | 21.4% | 28.5% |
| 0.32% | 0.08% | 8.6% | 14.2% |
| 0.40% | 0.08% | 10.2% | 9.0% |
| 0.16% | 0.16% | 17.6% | 22.2% |
| 0.24% | 0.16% | 12.8% | 14.3% |
| 0.32% | 0.16% | 13.6% | 6.7% |
| 0.40% | 0.16% | 14.9% | 10.6% |

The alternating slug process is also an effective recovery process.

The foregoing data clearly establishes that the amount of oil recovered after steam flooding can be increased by use of a hot alkaline polymer-containing fluid oil recovery process after the steam flood if the hot aqueous fluid contains a viscosifying amount of hydrophilic polymer and a synergistic mixture of sodium carbonate or sodium bicarbonate and sodium hydroxide or other alkalinity agent, in a critical concentration ratio.

While my invention has been described in terms of a number of illustrative embodiments, this is done in part for the purpose of complete disclosure and it is not intended to be in any way limitative or restrictive of the true spirit and scope of my invention, which will be described more precisely hereinafter below in the claims.

I claim:

1. A method of recovering petroleum from a subterranean, petroleum-containing, permeable formation penetrated by an injection well and a producing well comprising
   (a) introducing into the formation via the injection well a predetermined quantity of steam having quality of from 0.0 to 99.0 weight percent, said stream entering and sweeping petroleum from a portion of the formation and displacing petroleum toward the producing well;
   (b) recovering petroleum together with the injected fluids from the formation via the producing well; and thereafter
   (c) injecting a liquid phase displacing fluid into the same portion of the formation as was swept by steam, said liquid containing a viscosifying amount of a hydrophillic polymer, from 0.005 to 2.0 percent by weight of an alkalinity agent and from 0.01 to 5.0 percent by weight of an alkalinity-stabilizing agent selected from the group consisting of sodium carbonate, sodium bicarbonate and mixtures thereof, said liquid phase displacing fluid displacing petroleum through the formation to the production well; and
   (d) recovering petroleum via the producing well.

2. A method as recited in claim 1, wherein the steam also contains from 0.005 to 2.0 percent by weight alkalinity agent and from 0.01 to 5.0 percent by weight of an alkalinity-stabilizing agent.

3. A method as recited in claim 2 wherein the alkalinity agent in the steam is selected from the group consisting of sodium hydroxide, potassium hydroxide, sodium orthosilicate and mixtures thereof.

4. A method as recited in claim 3 wherein the alkalinity agent is sodium hydroxide.

5. A method as recited in claim 2 wherein the alkalinity stabilizing agent in the steam is selected from the group consisting of sodium carbonate and sodium bicarbonate.

6. A method as recited in claim 5, wherein the alkalinity stabilizing agent is sodium carbonate.

7. A method as recited in claim 1 wherein the alkalinity agent present in the liquid phase displacing fluid is sodium hydroxide or potassium hydroxide.

8. A method as recited in claim 1 wherein the concentration of the alkalinity agent in the liquid phase displacing fluid is from 0.01 to 1.0 percent by weight.

9. A method as recited in claim 1 wherein the alkalinity-stabilizing agent present in the liquid phase displacing fluid is sodium carbonate.

10. A method as recited in claim 1 wherein the concentration of alkalinity-stabilizing agent present in the liquid phase displacing fluid is from 0.05 to 3.0 percent by weight.

11. A method as recited in claim 1 wherein the hydropyhillic polymer is selected from the group consisting of polysaccharide and partially hydroxlyzed polyacrylamide.

12. A method as recited in claim 11 wherein the polymer is polysaccharide.

13. A method as recited in claim 11 wherein the polymer is partially hydrolyzed polyacrylamide.

14. A method as recited in claim 11 wherein the concentration of polymer is from 0.01 to 2.0 percent by weight.

15. A method as recited in claim 11 wherein the concentration of polymer is from 0.02 to 1.0 percent by weight.

16. A method as recited in claim 1 wherein the volume of liquid phase displacing fluid injected is from 0.005 to 1.0 pore volume based on the portion of the formation to be flooded.

17. A method as recited in claim 16 wherein the volume of fluid injected is from 0.3 to 0.8 pore volume based on the portion of the formation to be flooded.

* * * * *